United States Patent [19]

Bremer, Jr.

[11] 4,083,265
[45] Apr. 11, 1978

[54] TORSIONAL VIBRATION DAMPER

[75] Inventor: Robert Charles Bremer, Jr., Brownsburg, Ind.

[73] Assignee: Wallace Murray Corporation, New York, N.Y.

[21] Appl. No.: 664,381

[22] Filed: Mar. 5, 1976

[51] Int. Cl.² ............................................. G05G 1/00
[52] U.S. Cl. ....................................................... 74/574
[58] Field of Search ........................................... 74/574

[56] References Cited

U.S. PATENT DOCUMENTS

| 2,861,472 | 11/1958 | Hansz | 74/574 |
| 2,939,338 | 6/1960 | Troyer | 74/574 |
| 2,972,904 | 2/1961 | Troyer | 74/574 |
| 3,078,737 | 2/1963 | McGavern | 74/574 |

Primary Examiner—Samuel Scott
Assistant Examiner—Wesley S. Ratliff, Jr.
Attorney, Agent, or Firm—Thomas J. Greer, Jr.

[57] ABSTRACT

A torsional vibration damper of the type having a hub which carries an outer inertia ring coupled thereto by an elastomer. Supplemental damping is added to the system via the use of dry friction. A broad frequency range of effectiveness is provided by designed non-linearity of the device made possible by the dry friction. A greater broadening of the frequency range of effectiveness is made possible by utilizing a plurality of inertia masses carried by the hub, all mounted on the same elastomer. Elastomeric compression is utilized to spring-load the friction surfaces, providing a series-parallel, elastomer viscous-dry friction damping medium. In multiple mass application the concept of mass interaction is utilized to further determine the dynamic performance of the damper.

7 Claims, 11 Drawing Figures

TORSIONAL VIBRATION DAMPER

This invention relates to torsional vibration dampers of the type having a hub secured to an outer inertia member by an elastomer annulus.

The invention exhibits particular utility to the damping of torsional vibrations in internal combustion engines. Such dampers are generally classified at present in Class 74, Sub-class 574 in the United States Patent Office. Torsional vibrations may be considered as back-and-forth twistings of the crankshaft of an internal combustion engine, superimposed upon the main, uni-directional rotation of the crankshaft. Unless controlled, such torsional vibrations will often lead to failure of the crankshaft, as well as contributing to failure in other parts of the engine or its cooling system, particularly where one of the resonant frequency modes of the crankshaft coincides with the particular firing frequency of the engine or a particular harmonic of that frequency. According to present theory of elastomer vibration dampers, the torsional vibrational energy transmitted to the crankshaft by the action of the pistons is converted into heat in the elastomer. The elastomer may accordingly be considered as a drain or sump which continually receives a portion of the energy which causes torsional vibrations.

A common form of such a damping device includes an outer or inertia member in the form of a ring or annulus of some significant mass. The inner portion of this ring is attached to an elastomer annulus which, in turn, is secured to a hub or other element in turn attached to the rotating crankshaft of an engine. Both the hub and the inertia members may be of cast iron. As the crankshaft is turning, each incremental application of torque, as occasioned by rapid fuel combustion in a cylinder, results in a slight acceleration of the metal adjacent the crank arm. When the metal recovers, due to its natural elasticity or resilience, it rotates slightly in the opposite direction. Such forces result in torsional vibrations in the shaft. In a typical instance of torsional vibration, an engine crankshaft turning at a rate of 3000 r.p.m. simultaneously executes angular vibrations of an amplitude of from one-fourth degree to one degree at a frequency of 150 to 250 cycles per second.

The purpose of a torsional vibration damper is to reduce the amplitude of torsional vibrations. Such reduction lowers the strength requirements of the crankshaft and hence lowers the weight of the crankshaft. The damper has a direct effect on the crankshaft and also inhibits vibration of various other components of the internal combustion engine which are affected by crankshaft vibration.

As an internal combustion engine is operated at various engine speeds, several vibrational frequencies appear on the crankshaft. In general, most automotive and diesel engines of present design and not utilizing a torsional vibration damper have one fairly high amplitude resonant frequency within the engine operating range of speeds. However, at any given engine speed, torsional vibrations from various orders of vibration are present and can be significant.

The use of dry friction to damp vibration is known in this art. It is known to utilize dry friction alone as a damping medium, and in parallel with the viscous type damping medium available by distorting elastomeric type materials. Within the context and terminology of vibration dampers a parallel combination of damping mediums means the forces or torques transmitted through the two mediums are not equal, while in a series combination of damping mediums the forces or torques transmitted through the two medium are always equal in a time averaged sense. The following examples are U.S. Patents issued to cover dry friction alone as a damping medium: U.S. Pat. Nos. 1,670,369 issued to MacPherson; 1,967,446 issued to Meyer; 2,062,369 issued to Meyer; 1,840,655 issued to Breer; 1,840,656 issued to Breer; and 2,960,189 issued to Osburn. The three major disadvantages of a pure dry friction damper are: (1) the difficulty of maintaining radial concentricity between the inertial mass and the hub necessary to minimize the radial unbalance of a high speed rotating part, brought about by the mechanical requirement for a bearing surface between the two members; (2) an additional balance problem brought about by the fact that the inertial mass can vary its angular position relative to th hub and thus the overall balance of the part is allowed to vary continuously during operation; (3) and the limited amount of relative vibrational amplitude provided by pure friction contact between the inertial mass and the hub. The amount of energy absorbed by such a device is a function of the relative motion between the two major members, which in this case is limited to the magnitude of hub vibration, and then only at very high frequencies relative to the design frequency. The following are examples of U.S. Patents issued to cover dry friction employed in parallel with elastomeric type viscous friction: U.S. Pat. Nos. 1,984,579, issued to Griswold; 2,083,561, issued to Griswold; 2,153,914, issued to Christman; 2,383,400, issued to McFarland; 2,440,956, issued to Kearns; 3,020,739, issued to Roe; 3,075,405, issued to Krebs; and 3,077,123, issued to Katzenberger. The parallel application of elastomeric and dry friction damping mediums effectively solves the unbalance problems of pure dry friction dampers, but possesses the disadvantage of a poor low frequency response. At a given hub vibrational amplitude, and at frequencies below that which would produce inertia ring acceleration of significant magnitude to surpass the static or breaking torque of the contact dry friction surfaces, the inertia ring is locked into the hub, there is no relative motion between the inertia ring and the hub and thus no damping, and the damper is essentially a dead mass. Thus, in the parallel type elastomer-dry friction damper operating at acceleration below the breaking acceleration all of the inertia ring torque is being transmitted through the dry friction medium, with no torque passing through the elastomeric medium. U.S. Pat. No. 1,913,984 issued to Hann is an example of a pure series combination of elastomeric and dry friction damping mediums in that the forces generated by inertia mass vibration transmitted through the dry friction medium are equal to the force transmitted through the elastomeric medium on a time averaged basis. In a pure series deployment such as in Hann, in essence, a pure dry friction damper operates in series with an elastomer medium and all of the problems of a pure dry friction damper are still apparent.

The use of two seismic or inertia masses, each of different masses, is known in this art for the purpose of damping two particular frequencies. A parallel damper arrangement can thus be tuned to optimize damping for the two major resonant frequencies. A multiple mass damper can, similarly, damp multiple resonant frequency vibrations. In prior parallel dampers, such as shown at FIG. 3 of U.S. Pat. No. 3,075,405 to Krebs and FIG. 2 of U.S. Pat. No. 2,477,081 to Pierce, each inertia member is secured to the hub by its own separate elastomer member.

Again, U.S. Pat. No. 1,967,446, issued to Meyer, shows the two mass concepts designed to use dry friction as the damping medium. In general, prior art relating to more than one inertial mass employed in a vibration damper shows two employed masses essentially operating independent of one another utilizing pure elastomeric or dry friction damping mediums, or parallel combinations of the two mediums.

According to the practice of the present invention elastomeric and dry friction damping mediums are used together to produce a vibration damper. An elastomeric and dry friction medium are deployed in a series combination, and this combination then deployed in parallel with an elastomeric medium. The series combination produces a non-linear spring, and when used in parallel with an elastomeric medium provides the damper with a designed non-linear dynamic characteristic desirable in vibration applications. The combination retains the desired characteristic of pure elastomeric and pure dry friction dampers, but eliminates the design limitation of each. The net result is a specific damping capability that is greater than either medium employed alone. In other embodiments a plurality of inertia masses are mounted on and carried by the same elastomer member. The entire damper is assembled in one step and utilizes the elastomer member cross-sectional geometry to provide axial integrity. A series rubber-dry friction medium is employed between masses to take advantage of the relative motion between individual masses as well as relative motion between the inertia mass and the hub member which is commonly utilized. In other embodiments a plurality of inertia masses are mounted on and carried by, again, the same elastomer member, and axially variable rubber radial deformation utilized to provide dry friction mass interaction to any degree desired, including no interaction. In another embodiment dry friction is employed in parallel with elastomeric damping medium to provide greater axial integrity. In general, the invention relates to utilizing dry friction and/or elastomeric damping mediums, in conjunction with single or multiple inertial masses to produce vibration dampers with a designed non-linearity to yield a wider effective frequency bandwidth than either medium alone or both mediums in simple parallel combination is capable of displaying.

Figure 1:
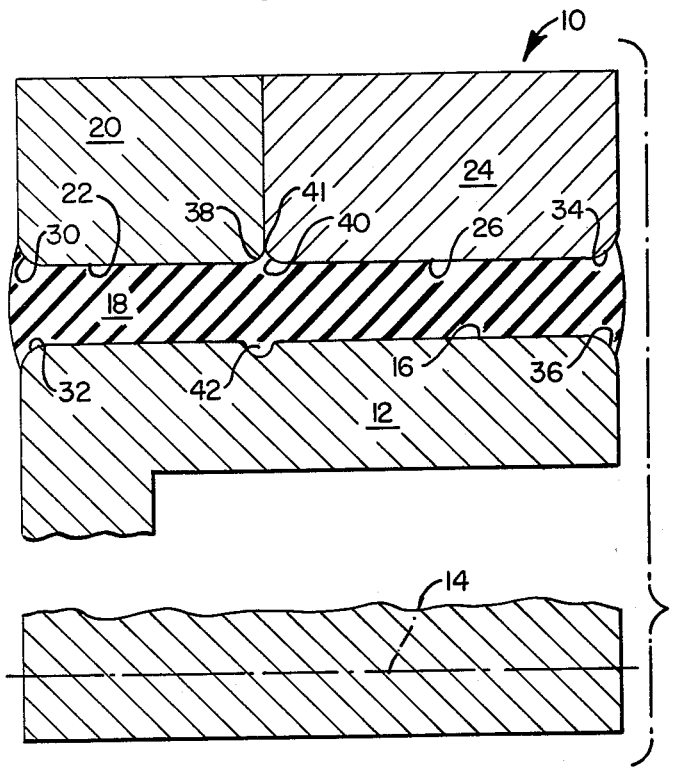
FIG. 1 is a partial cross-sectional view of a plural mass torsional vibration damper employing a common elastic member and no inertia member (mass) interaction.
Figure 3:
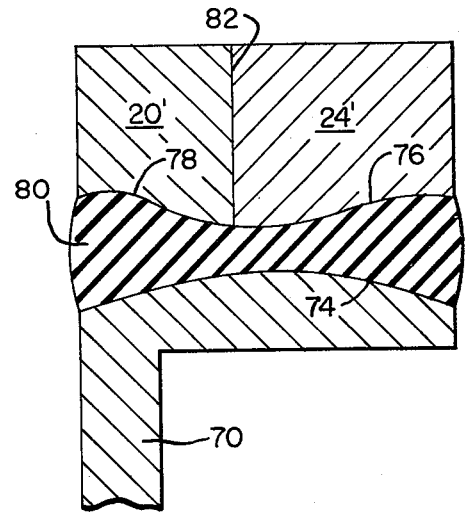
FIG. 3 is an embodiment demonstrating axial variation of rubber radial compression to produce dry friction mass interaction in a plural mass vibration damper employing a single elastic member.
Figure 2:
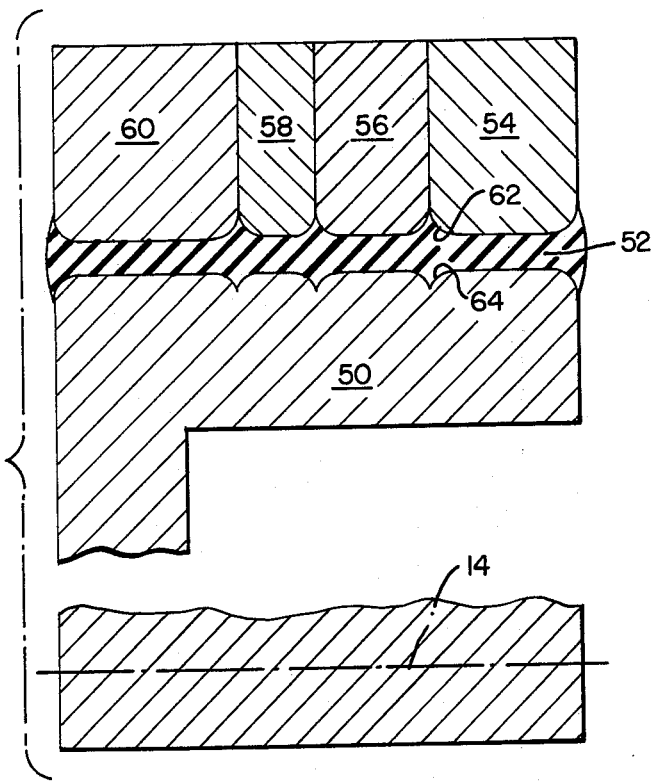
FIG. 2 is a view similar to FIG. 1 and shows an embodiment carrying four inertia members with no mass interaction.

Referring now to FIG. 1 of the drawings, the numeral 10 denotes generally a torsional vibration damper constructed in accordance with the practice of this invention and includes a hub member denoted by the numeral 12, the hub adapted to be coupled to a shaft (not illustrated) having an axis of rotation 14. The outer radial surface of the hub is denoted by the numeral 16, the hub carrying a continuous annular elastomer band denoted by the numeral 18. The numeral 20 denotes a first inertia ring (inertia member) having an innermost radial surface 22 which is in contact with the elastomer band. A second inertia ring is also carried by elastomer band 18, the inertia ring denoted by the numeral 24 and having an innermost radial surface 26. The numeral 30 denotes a rounded chamfer or assembly radius adjacent the left axial face of ring 20, the numeral 32 denoting a similar chamfer adjacent the left axial face of the hub. At the right axial face of the torsional vibration damper, assembly radii 34 and 36, of similar chamfer are also provided. The numerals 38 and 40 denote additional assembly radii at the innermost radial portion of the abutting faces of inertia rings 20 and 24. A continuous angular groove 41 is thereby defined and a corresponding groove 42, axially positioned at groove 41, is provided in the hub member. It will be understood that each of the several assembly radii is annularly continuous.

Elastomer 18 is under radial deformation (compression) and accordingly bulges somewhat at its two axial ends. The elastomer is usually adhesively bonded to both the hub member and to the inertia rings. Bonding techniques for carrying this out are well known in the art and form no part of this invention.

The operation of the damper illustrated at FIG. 1 is as follows. Torsional vibrations from the internal combustion engine are transmitted through the crankshaft to hub 12, the axis of rotation 14 often coinciding with the axis of rotation of the crankshaft. The hub 12 executes torsional vibrations, with cast iron inertia rings 20 and 24 lagging behind or out of phase therewith by virtue of the elasticity of elastomer material 18. In a manner well known to workers in this art, elastomer member 18 converts at least a portion of the energy attendant torsional vibrations into heat, thereby inhibiting the build-up of their amplitude to dangerously high levels.

At regions inwardly of annular surface 22 of ring 20 the elastomer is radially deformed, while at the left axial face and at grooves 41 and 42 there is little or no radial deformation because at these regions the elastomer is free to expand. Similarly, radial deformation of the elastomer is present along inner surface 26 of inertia bers 150 into frictional contact with the innermost axial surfaces of abutment plates 138. The numeral 152 denotes an elastomer band which is radially compressed by the inertia member, both the radially innermost and radially outermost faces of the elastomer 152 preferably bonded to the respective ring and hub members.

Figure 7:
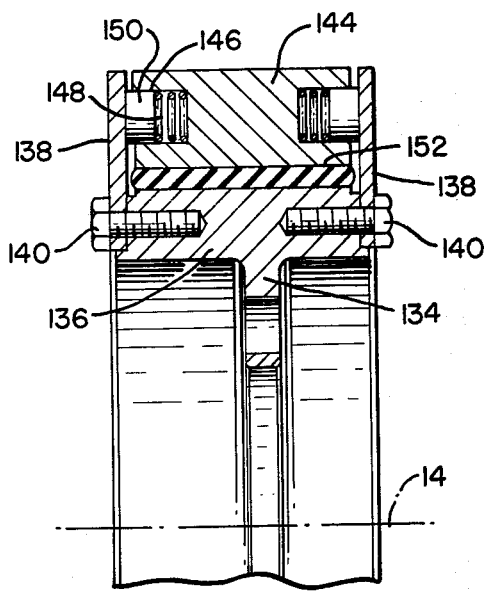
FIG. 7 is an embodiment demonstrating a parallel combination of elastomeric and dry friction damping mediums with the dry friction medium providing additionally lateral damper integrity.

The mode of operation of this embodiment will be apparent. Briefly, torsional vibrations result in relative rotation between hub 136 and inertia ring 144. This results in the generation of heat and consequent damping of torsional vibrations by elastomer 152. Additionally, such relative rotation results in a rubbing action between the friction piston members 150 and abutment plates 138. Such friction also serves to dampen the torsional vibrations. The embodiment of FIG. 7 is characterized by the utilization of dry friction, and elastomeric damping mediums in a parallel configuration, that is to say, the time averaged forces transmitted through each medium are not equal. This type of damping deployment is, again, of the type used by Krebs in U.S. Pat. No. 3,075,405. The improvement in the embodiment of FIG. 7 is in the mechanical technique of that deployment. The rubbing or dry friction interface is seen between elements 150 and 138. Since friction materials like brake lining are poor thermal conductors, the heat flow from the rubbing contact will be into the disc 138. By the nature of its thin axial profile it represents a good heat transfer fin. It is generally known to utilize fins to aid in cooling a high temperature body, because of the greater surface area provided to aid in heat conduction to the surronding air. Friction contact on both axial extremes of the inertia member 144 form a mechanical lock against axial excursions of the inertia ring relative to the hub 134. Any additional foreign material that might tend to contaminate the friction surfaces as well as abraded material from the rubbing involvement itself will, through centrifugal forces arising from the high speed rotation of the part, tend to be ejected radially.

Figure 4:
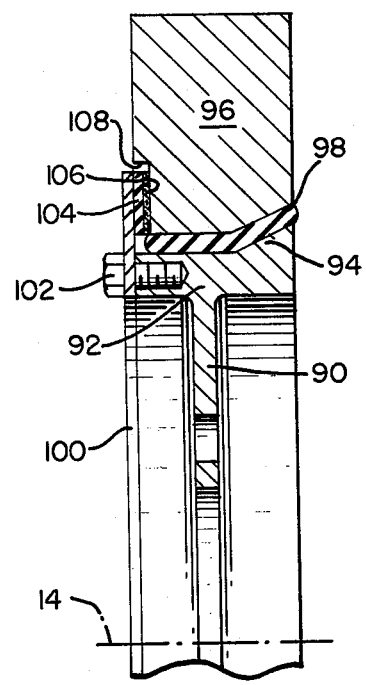
FIG. 4 is an embodiment demonstrating a series elastomeric-dry friction damping medium in parallel with a pure elastomeric medium to produce a non-linear damper characteristic.
Figure 5:
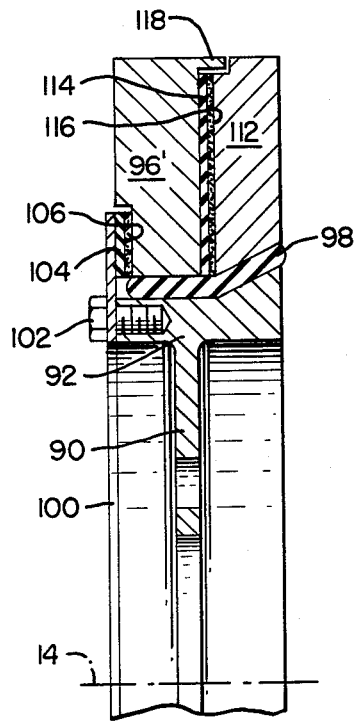
FIG. 5 is a view similar to FIG. 4 wherein two inertia members are employed and non-linear mass interaction is present due to a series elastomeric-dry friction damping medium between masses.
Figure 6:
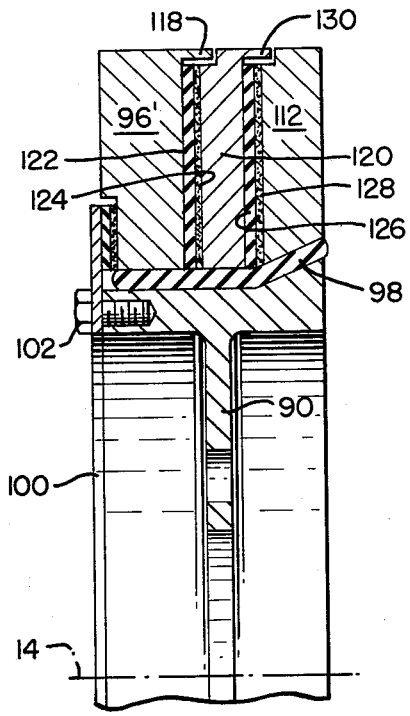
FIG. 6 is a view similar to FIG. 5 and illustrates the concept of FIG. 5 applied to three inertia members.
Figure 8:
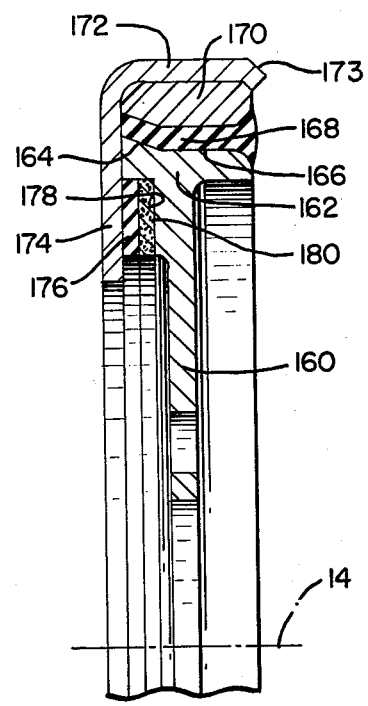
FIG. 8 is an embodiment demonstrating the concepts of FIG. 5 in a form more inexpensive to manufacture, and employing varying elastomeric cross-sectional geometry in conjunction with a series elastomeric-dry friction damping medium for lateral integrity.
Figure 9:
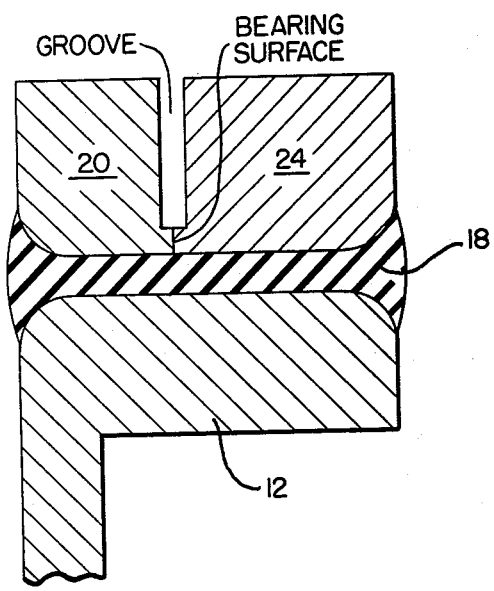
FIGS. 9 and 10 are similar to FIG. 1, and bear corresponding reference numerals, and illustrate zero mass interaction.
Figure 10:
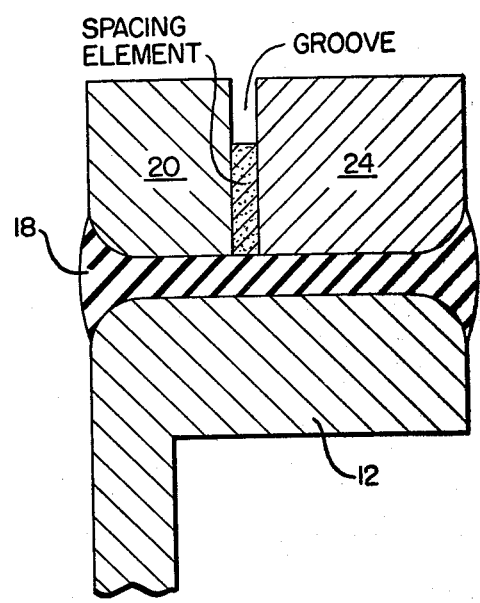
Figure 11:
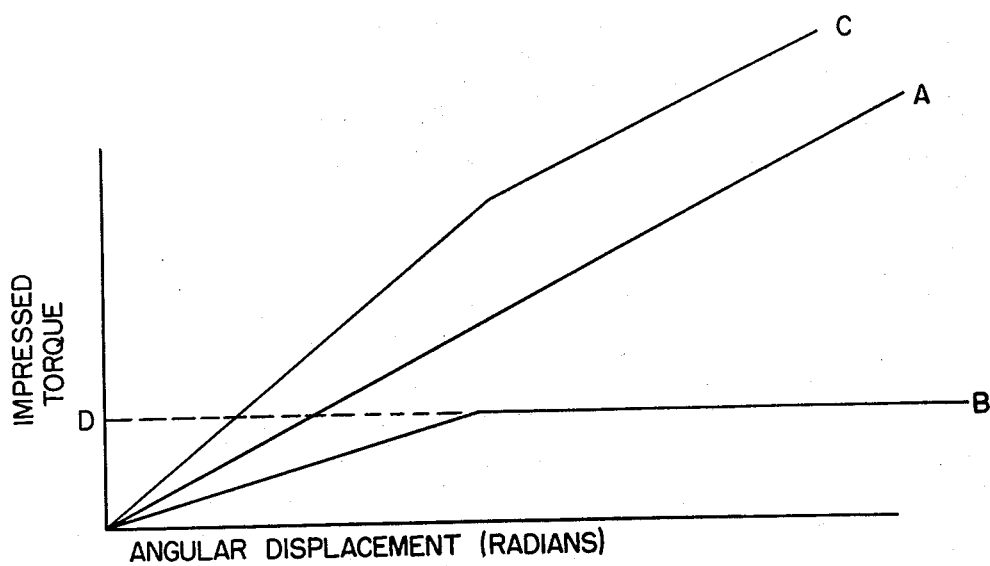
FIG. 11 illustrates linear and non-linear behavior of certain elements in, for example, FIG. 4 of the drawings.

Referring now to FIG. 8 of the drawings, another modification is illustrated which employs both elastomeric damping and friction pad damping in the exact manner of FIG. 4. The numeral 160 denotes the web portion of annular hub 162, the hub adapted to be attached to a crankshaft having an axis of rotation 14. The numeral 164 denotes a conical surface at the left portion of the outer rim of the hub, the numeral 166 denoting a cylindrical portion extending from the junction with conical portion 166 to the right-hand axial face of the torsional vibrational damper. The numeral 168 denotes an elastomer band carried on the outer radial portion of the hub, the band in turn carrying inertia ring 170. The right face of both the inertia ring and the hub is annularly chamfered as indicated. Preferably, the elastomer band 168 is bonded to both the hub and the inertia ring and is radially deformed, as indicated by the bulge at the right-hand portion of the elastomer. The numeral 172 denotes the radially outermost portion of a clamping cup which is annularly continuous. The clamping cup includes dimpled portions 173 at angular locations around the plate, the dimples 173 being radially inwardly swaged so as to frictionally contact the indicated outermost portion of inertia ring 170. The clamping cup also includes a radially disposed portion 174, also angularly continuous, which carries on the indicated inside surface an elastomer ring or disc denoted by the numeral 176. A friction material ring or disc of the type previously described is denoted by the numeral 178. Both the elastomer ring 176 and friction material ring 178 fit in angularly continuous recess 180 at the left face of hub 162. Again, because of the different interface friction values, it is not necessary to bond the elastomer ring 176 to the metal portion 174, or to bond the friction material 178 to the elastomer 176.

During operation, the device functions as previously described with respect to the embodiment illustrated at FIG. 4 of the drawings. Inertia ring 170 cooperates with elastomer band 168 and the hub 162 to damp vibrations in a manner previously described. At relatively low torsional vibrations inertia forces, both elastomer 176 and friction material 178 will follow the vibrations. However, as torsional vibrational rotational forces increase, the lesser coefficient of friction between material 178 and the metal of hub 162 will result in relative motion between these two surfaces, while the greater coefficient of friction between the rubber and the friction material and between the rubber and the metal will inhibit relative rotation between these two portions. The result is the same as that which takes place in the embodiment of FIG. 4, previously described. However, no separate fastening means is required to position the elements in the indicated configuration, providing a simplified assembly.

What is claimed is:

1. The torsional vibration damper of the type having an annular hub adapted to be coupled to the crankshaft of an internal combustion engine to damp torsional vibrations thereof, the hub carrying an elastomer band at the outer radial surface thereof, the elastomer band carrying an outer-most inertia ring, the improvement comprising, the outer radial surface of the hub increasing in diameter toward one axial face of the hub from a point on said surface intermediate the axial faces of the hub to thereby define a conical hub portion, a complementary conical portion on the innermost radial surface of the inertia ring, a continuous annular clamping cup secured to the outermost radial portion of the inertia ring and extending radially inwardly across one axial face of the damper to define a radially disposed abutment portion, a flat elastomer ring and an adjacent, substantially coextensive, flat friction fabric ring both squeezed and sandwiched between said radially extending abutment portion and a portion of said hub.

2. The torsional vibration damper of claim 1, wherein said flat elastomer ring and said flat fabric friction material ring are positioned within a continuous annular recess in said hub.

3. The torsional vibration damper of claim 2, wherein said clamping cup is secured to the inertia ring by swaging of the clamping cup at a plurality of annularly-spaced portions.

4. A torsional vibration damper of the type including an annular hub adapted to be coupled to the crankshaft of an internal combustion engine to damp torsional vibrations thereof, means coupling an inertia ring to the hub for limited relative rotation with respect to the hub, the improvement comprising, a non-linear coupling between the hub and the inertia ring, said non-linear coupling being in parallel with the means to couple the inertia ring to the hub, said non-linear coupling also coupling said inertia ring to the hub.

5. The torsional vibration damper of claim 4 wherein said non-linear coupling includes an elastomer disc contacting a fabric friction material disc, both discs sandwiched between a member rigid with the inertia ring and the hub.

6. The torsional vibration damper of claim 5 wherein said first-mentioned means to couple the inertia ring to the hub is an elastomer annulus.

7. A torsional vibration damper of the type including an annular hub adapted to be coupled to the crankshaft of an internal combustion engine to damp torsional vibrations thereof, means coupling an inertia ring to the hub for limited relative rotation with respect to the hub, the improvement comprising, an additional coupling means between the hub and inertia member including an elastomer disc contacted by a substantially coextensive friction material disc, said elastomer disc and said friction material disc sandwiched by a member rigid with one of said hub and inertia ring and by the other of said hub and inertia ring, whereby a non-linear coupling defined by the elastomer disc and the friction material disc is provided between the hub and the inertia ring.

* * * * *